United States Patent [19]

Hari et al.

[11] Patent Number: 4,997,920
[45] Date of Patent: * Mar. 5, 1991

[54] MONOAZO COMPOUNDS CONTAINING LONG-CHAIN ALKYL RADICALS

[75] Inventors: Stefan Hari, Reinach; Olof Wallquist, Marly; Jost von der Crone, Arconciel, all of Switzerland

[73] Assignee: Ciba-Geigy Corporation, Ardsley, N.Y.

[*] Notice: The portion of the term of this patent subsequent to Aug. 7, 2007 has been disclaimed.

[21] Appl. No.: 405,612

[22] Filed: Sep. 11, 1989

[30] Foreign Application Priority Data

Sep. 14, 1988 [CH] Switzerland .................. 3430/88

[51] Int. Cl.$^5$ ............... C09B 29/01; C09B 29/34; C09B 29/36; D06P 3/79
[52] U.S. Cl. .................. 534/651; 534/591; 534/595; 534/650; 534/734; 534/740; 534/742; 534/801; 534/862; 534/865; 534/866; 534/874; 534/887; 106/22; 106/23; 106/496
[58] Field of Search ............... 534/651, 740, 742, 801, 534/862, 865, 866, 874, 650

[56] References Cited

U.S. PATENT DOCUMENTS

| | | | |
|---|---|---|---|
| 2,888,452 | 5/1959 | Schmid et al. | 534/651 |
| 3,096,321 | 7/1963 | Ribka | 534/750 |
| 3,113,938 | 12/1963 | Nakaten et al. | 534/801 |
| 3,124,565 | 3/1964 | Schilling et al. | 534/801 |
| 3,555,002 | 1/1971 | Ribka et al. | 534/742 |
| 3,555,003 | 1/1971 | Ribka | 534/742 |
| 3,845,032 | 10/1974 | Armento et al. | 534/651 |
| 4,003,886 | 1/1977 | Müller | 534/745 |
| 4,065,448 | 12/1977 | Müller | 534/649 |
| 4,150,019 | 4/1979 | Frölich et al. | 534/742 |
| 4,229,344 | 10/1980 | Müller et al. | 534/801 |
| 4,392,999 | 7/1983 | Müller et al. | 534/801 |
| 4,689,403 | 8/1987 | Ronco | 534/874 X |

FOREIGN PATENT DOCUMENTS 1238896 7/1971 United Kingdom .................. 534/801

OTHER PUBLICATIONS

Loeffler et al, *Chemical Abstracts*, vol. 109, No. 112059b (1988).

*Primary Examiner*—Floyd D. Higel
*Assistant Examiner*—Fiona T. Powers
*Attorney, Agent, or Firm*—JoAnn Villamizar

[57] ABSTRACT

Compounds of the formulae I and II

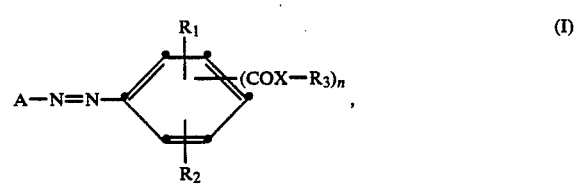

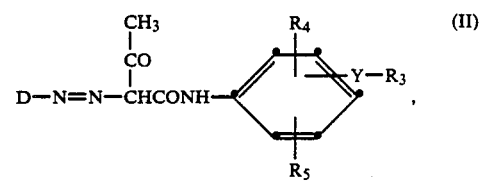

in which A is a radical of the formulae III, IV or V

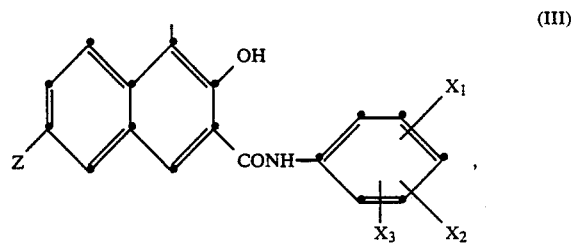

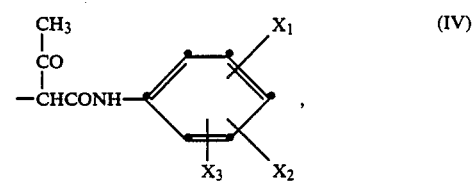

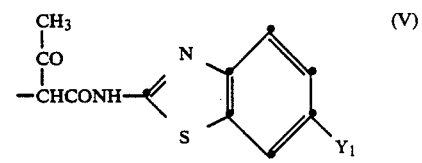

$R_1$ and $R_4$ are —H or —Cl, $R_2$ and $R_5$ are —H, halogen, —NO$_2$, —CN, $C_1$-$C_4$-alkyl, $C_1$-$C_4$alkoxy, —CF$_3$ or phenyloxy which is unsubstituted or substituted by one or two chlorine atoms and/or one or two methyl or methoxy groups, and $R_3$ is alkyl having at least 10 C atoms, X is a radical of the formulae —NH—, —O—,

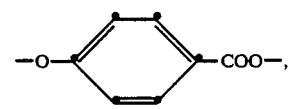

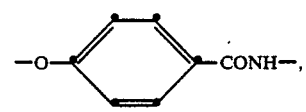

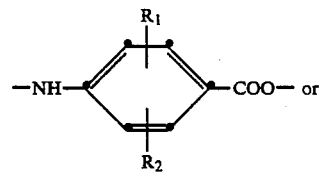

(Abstract continued on next page.)

-continued

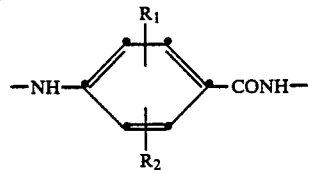

n is the number 1 or 2, Y is the radical of the formulae —COO—, —OOC—, —CONH— or —NHCO— or a radical of the formulae

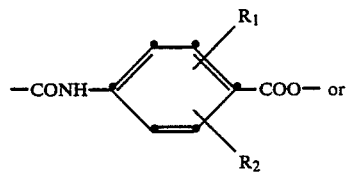

-continued

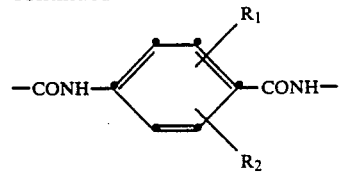

in which $R_1$ and $R_2$ are as defined above, D is an aromatic heterocyclic 5- or 6-membered ring, in which the ring contains 1 or 2 N atoms and may additionally contain an O atom or S atom, Z is —H, —Br, —OCH$_3$, —CN or —NO$_2$ and $X_1$ and $X_2$, independently of one another, are —H, halogen, —CH$_3$, —OCH$_3$, —OC$_2$H$_5$ or —NO$_2$ and $X_3$ is —H, —NHCO—C$_1$-C$_4$alkyl, benzoylamino or phenylcarboxamide which are each unsubstituted or substituted on the phenyl ring by one or two chlorine atoms and/or one or two methyl or methoxy groups or an —NHCO—C$_1$-C$_4$alkyl group, or $X_2$ and $X_3$ together with the carbon atom to which they are bound are an aromatic carbocyclic 6-membered ring or an aromatic heterocyclic 5- or 6-membered ring, in which the heterocyclic ring contains 1 or 2 N atoms and can additionally have an O atom or S atom, and $Y_1$ is —H, —OCH$_3$, —OC$_2$H$_5$ or —NHCOCH$_3$, with the proviso that $X_3$ must not be H, if X is —O— or —NH—, are highly suitable for the mass coloration of plastics, in particular of polyolefins.

10 Claims, No Drawings

MONOAZO COMPOUNDS CONTAINING LONG-CHAIN ALKYL RADICALS

The present invention relates to novel monoazo compounds containing at least one long-chain alkyl radical and their use for the dyeing of plastics, in particular of polyolefins, in the mass.

Azo pigments which contain alkyl radicals have been known for a long time. Red monoazo pigments are described, for example, in U.S. Pat. No. 3,124,565 and in GB Patent No. 1,238,896 (based on 2,3-oxynaphthoylaminobenzimidazolone) and in U.S. Pat. No. 4,229,344, U.S. Pat. No. 4,392,999 and U.S. Pat. No. 3,113,938 (based on 2,3-oxynaphthoheteroarylide), while yellow monoazo compounds are disclosed, for example, in U.S. Pat. No. 3,096,321 (based on acetoacetylaminobenzene), U.S. Pat. No. 3,555,002, U.S. Pat. No. 3,555,003 and U.S. Pat. No. 4,150,019 (based on acetoacetylaminobenzimidazolone). The main characteristic of the compounds listed there is that they have at least one lower alkyl radical of 6 C atoms at most. The products described there have been proposed for the pigmenting of plastics and paints. It is true that they have in general good pigment properties, but they do not always meet today's requirements of industry, in particular with respect to dispersability in certain applications.

Furthermore, according to German Offenlegungsschrift No. 3,634,393, it is known to use azo dyes which have carboxyl functions as solvent dyes for the dyeing of film-forming polymers, such as cellulose acetates, nitro- and ethylcellulose, polyvinyl chloride, polyvinylbutyral, shellac, modified rosin, polyamide or polyacrylic acid resins. Their carboxyl functions are alkylamide and/or alkyl ester radicals in which the sum of the C atoms in the ester and/or amide groups of the molecule is greater than 8. Dyes of this type are distinguished by very high solubility in the organic hydroxyl-containing solvents, such as are used in the dyeing of the above-mentioned polymers.

Finally, Swiss Patent No. 329,048 describes fat-soluble azo dyes which are derived, for example, from a naphthol AS component and contain a long-chain carboxylic alkyl ester radical of, for example, 18 C atoms in the diazo component.

It has now been found that monoazo pigments containing at least one long-chain alkyl radical are surprisingly highly suitable for the mass coloration of plastics, in particular of polyolefins. These pigments have excellent dispersability, little tendency for efflorescence and good general pigment properties.

The present invention accordingly relates to compounds of the formulae I and II

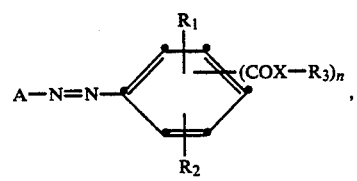

(I)

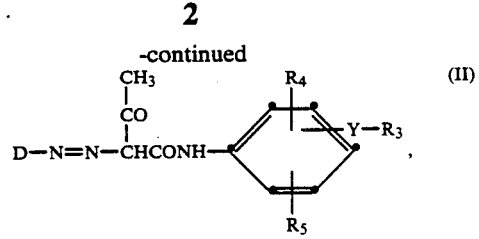

(II)

in which A is a radical of the formulae III, IV or V

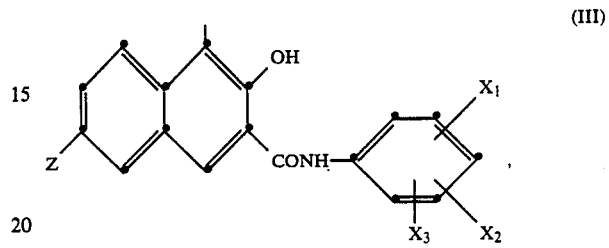

(III)

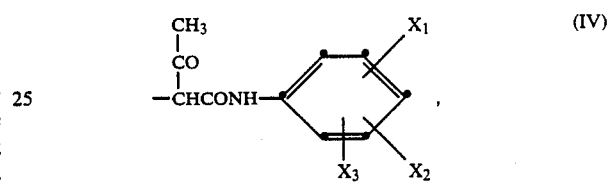

(IV)

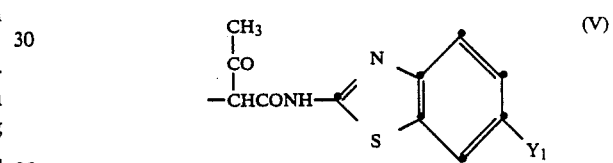

(V)

$R_1$ and $R_4$ are —H or —Cl, $R_2$ and $R_5$ are —H, halogen, —NO$_2$, —CN, $C_1$-$C_4$-alkyl, $C_1$-$C_4$alkoxy, —CF$_3$ or phenyloxy which is unsubstituted or substituted by one or two chlorine atoms and/or one or two methyl or methoxy groups, and $R_3$ is alkyl having at least 10 C atoms, X is a radical of the formulae —NH—, —O—,

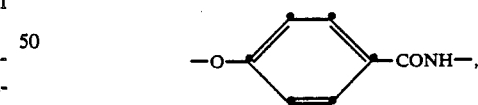

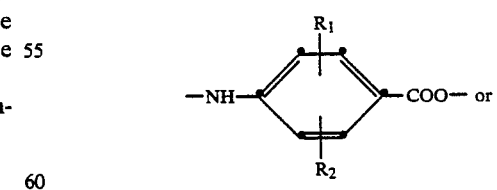 or

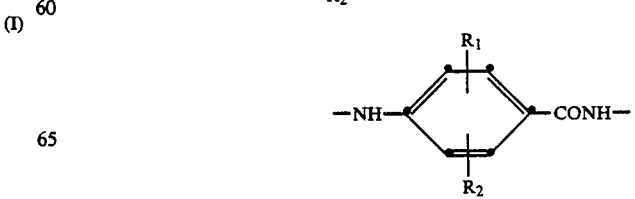

n is the number 1 or 2, Y is the radical of the formulae —COO—, —OOC—, —CONH— or —NHCO— or a radical of the formulae

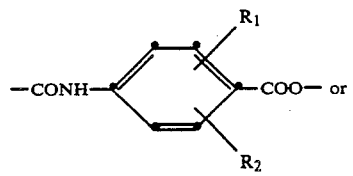

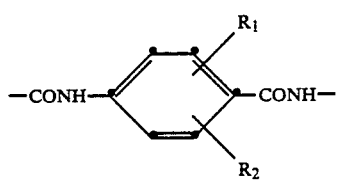

in which $R_1$ and $R_2$ are as defined above, D is an aromatic heterocyclic 5- or 6-membered ring, in which the ring contains 1 or 2N atoms and may additionally contain an O atom or S atom, Z is —H, —Br, —OCH$_3$, —CN or —NO$_2$ and $X_1$ and $X_2$, independently of one another, are —H, halogen, —CH$_3$, —OCH$_3$, —OC$_2$H$_5$ or —NO$_2$ and $X_3$ is —H, —NHCO-C$_1$-C$_4$alkyl, benzoylamino or phenylcarboxamido which are each unsubstituted or substituted on the phenyl ring by one or two chlorine atoms and/or one or two methyl or methoxy groups or an —NHCO-C$_1$-C$_4$alkyl group, or $X_2$ and $X_3$ together with the carbon atom to which they are bound are an aromatic carbocyclic 6-membered ring or an aromatic heterocyclic 5- or 6-membered ring, in which the heterocyclic ring contains 1 or 2N atoms and can additionally have an O atom or S atom, and $Y_1$ is —H, —OCH$_3$, —OC$_2$H$_5$ or —NHCOCH$_3$, with the proviso that $X_3$ must not be H, if X is —O— or —NH—.

The formulae shown above represent one of the possible tautomeric forms.

Halogen in the groups listed above is fluorine, bromine and in particular chlorine. C$_1$-C$_4$alkyl as R$_2$ and R$_5$ or in X$_3$ radicals —NHCO-C$_1$-C$_4$alkyl is methyl, ethyl, n-propyl, isopropyl, n-butyl, isobutyl and tert-butyl, but in particular methyl.

C$_1$-C$_4$alkoxy as R$_2$ and R$_5$ is, for example, methoxy, ethoxy, n-propoxy, isopropoxy, n-butoxy and tert-butoxy, but in particular methoxy.

X is preferably —O— or —NH—, Y is preferably —COO— or —CONH— and n is preferably the number 1.

Z is preferably —H.

Aromatic carbocyclic 6-membered rings (in the definition of $X_2$ and $X_3$ together with the carbon atoms of the adjacent phenyl ring) which are suitable according to the invention are derived, for example, from α-naphthlyamine.

Aromatic heterocyclic 5- or 6-membered rings (in the definition of $X_2$ and $X_3$) which are suitable according to the invention are derived, for example, from amines of the formula

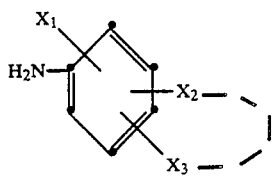

in which $X_2$ and $X_3$ form, as defined, an aromatic heterocyclic 5- or 6-membered ring. Examples of these are: 5-amino-benzimidazolone, 7-chloro-5-amino-benzimidazolone, 7-bromo-5-amino-benzimidazolone, 6-chloro-5-amino-benzimidazolone, 6-bromo-5-amino-benzimidazolone, 6-methoxy-5-amino-benzimidazolone, 7-methoxy-5-amino-benzimidazolone, 6-ethoxy-5-amino-benzimidazolone, 7-chloro-4-methyl-5-amino-benzimidazolone, 6-methyl-5-amino-benzimidazolone, 4,7-dimethyl-5-amino-benzimidazolone, 4-methyl-6-chloro-5-amino-benzimidazolone, 5-amino-1-methyl-benzimidazolone, 6-amino-2,4-dihyroxyquinazoline, 6-amino-1,4-dihydroxyquinazoline, 6-amino-4-methyl-2-quinolone, 7-amino-4-methyl-2-quinolone, 7-amino-4,6-dimethyl-2-quinolone, 6-amino-7-chloro-4-methyl-2-quinolone, 7-amino-4-methyl-6-methoxy-2-quinolone, 5-aminobenzoxazolone, 6-aminobenzoxazolone, 6-amino-5-methyl-benzoxazolone, 6-amino-5-chloro-benzoxazolone, 6-amino-3-phenmorpholone, 7-amino-6-chloro-3-phenmorpholone, 7-amino-6-methyl-3-phenmorpholone, 7-amino-6-methoxy-3-phenmorpholone, 6-amino-4-methyl-3-phenmorpholone, 7-amino-4-methyl-3-phenmorpholone, 7-amino-4,6-dimethyl-3-phenmorpholone, 6-amino-4-quinazolinone and 5-aminophthalimide.

Preference is given to the benzimidazolone compounds, in particular to 5-amino-benzimidazolone, 6-methyl-5-amino-benzimidazolone and 5-amino-1-methyl-benzimidazolone.

Alkyl having at least 10 C atoms in the definition of R$_3$ is branched or straight-chain alkyl, for example n-decyl, n-dodecyl, n-tridecyl, isotridecyl, n-tetradecyl (myristyl), n-pentadecyl, n-hexadecyl, 1-methylpentadecyl, n-octadecyl, n-eicosyl, n-tetracosyl, n-hexacosyl, n-triacontyl and n-pentacontyl.

Alkyl as R$_3$ is preferably C$_{12}$- to C$_{35}$alkyl, in particular C$_{12}$- to C$_{18}$alkyl, or mixtures thereof, and is derived, for example, from the alcohols known and freely available as alfols which are used as starting materials and contain essentially alkyl groups having the same number of C atoms and being predominantly branched. The alkyl groups are designated here as "alfyl", for example alfyl-C$_{12}$, alfyl-C$_{14}$. Long-chain alkylamine radicals having at least 10 C atoms, which are used as starting materials, are derived, for example from n-decyl-, lauryl-, myristyl- and stearylamine.

Preference is given to compounds of the formulae I and II in which R$_3$ is C$_{12}$-C$_{35}$alkyl, Y is —COO— or —CONH—, n is the number 1, and R$_1$, R$_2$, R$_4$, R$_5$, A and D are as defined above.

Particular preference is given to compounds of the formulae VI and VII

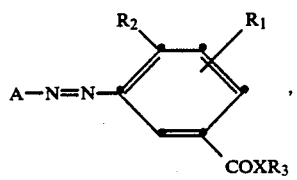

(VI)

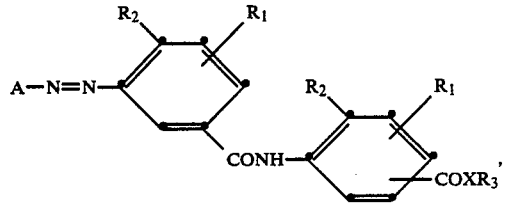

(VII)

in which X is —O— or —NH—, $R_1$ is —H or —Cl, and $R_2$ is —Cl, —CH₃, —OCH₃, —OC₂H₅ or —OC₆H₅, A is a radical of the formula III in which Z is —H, $X_1$ and $X_2$, independently of one another, are —H, —Cl, —CH₃ or —OCH₃, and $X_3$ is —H, —NHCOCH₃, benzoylamino or phenylcarboxamido which are each unsubstituted or substituted by one or two chlorine atoms and/or one or two methyl or methoxy groups or by —NHCOCH₃, or $X_2$ and $X_3$ together with the carbon atom to which they are bound form a ring of the formulae

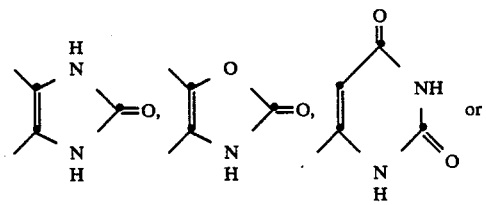

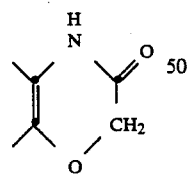

and $R_3$ is $C_{12}$–$C_{18}$alkyl, in particular $C_{18}$alkyl, with the proviso that $X_3$ in formula VI must not be —H, if X is —O— or —NH—.

Particular preference is given to compounds of the formulae VI and VII in which $R_1$ is —H and $R_2$ is —Cl, —CH₃ or —OCH₃, and the group —COXR₃ (in formula VII) is in the p-position relative to group $R_2$.

Very particular preference is given to compounds of the formula VIII,

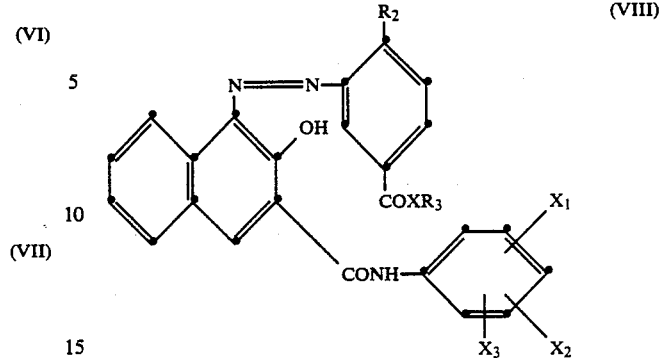

(VIII)

in which X is —O— or —NH—, $R_2$ is —CH₃ is $C_{12}$–$C_{18}$alkyl, in particular $C_{18}$alkyl, and $X_1$, $X_2$ and $X_3$ are as defined above. In the above formula VIII, $X_1$ and $X_2$ are preferably —H, —Cl or —CH₃ and $X_3$ is benzoylamino which is unsubstituted or substituted by —Cl or —CH₃.

Examples of compounds of the formula I have the formula

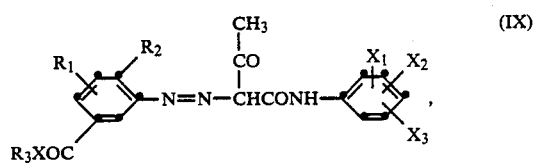

(IX)

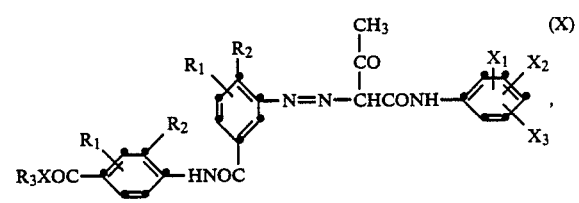

(X)

and examples of compounds of the formula II have the formula

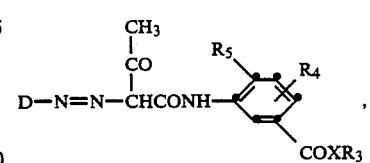

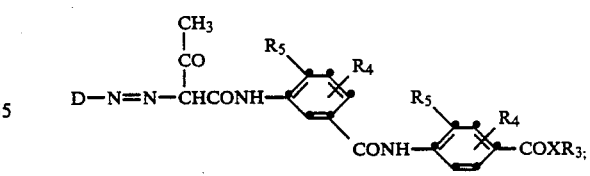

in which X is —O— or —NH—, $R_1$ and $R_4$ are —H or —Cl, $R_2$ and $R_5$ are —Cl, —CH₃ or —OCH₃ and $R_3$ is $C_{12}$–$C_{18}$alkyl, $X_1$ and $X_2$, independently of one another, are —H, —Cl, —CH₃ or —OCH₃, and $X_3$ is —H, —NHCOCH₃, benzoylamino which is unsubstituted or substituted by one or two chlorine atoms and/or one or two methyl or methoxy groups or by —NHCOCH₃, or $X_2$ and $X_3$ together with the carbon atom to which they are bound form a ring of the formulae

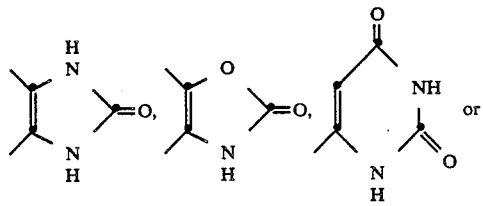
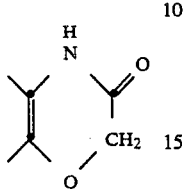

and D is a 5-benzimidazolonyl, 5- or 6-benzoxazolonyl, 6-(2,4-dihydroxy)quinazolinyl, 6- or 7-(4-methyl)quinolone-2-yl, 6- or 7-phenmorpholone-3-yl or 6-quinazolone-4-yl radical.

Preference is given to compounds of the formulae IX and X in which X is —O— or —NH—, $R_1$ is —H or —Cl, $R_2$ is —Cl, —$CH_3$ or —$OCH_3$ and $R_3$ is $C_{12}$–$C_{18}$alkyl, $X_1$ and $X_2$, independently of one another, are —H, —Cl, —$CH_3$ or —$OCH_3$, and $X_3$ is —H, —$NHCOCH_3$, benzoylamino which is unsubstituted or substituted by one or two chlorine atoms and/or one or two methyl or methoxy groups or by —$NHCOCH_3$, or $X_2$ and $X_3$ together with the carbon atom to which they are bound form a ring of the formulae

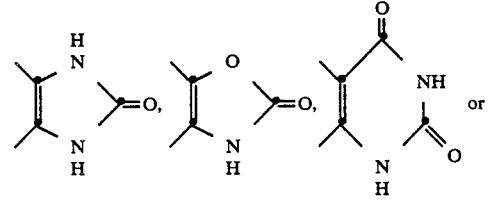
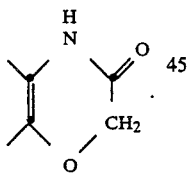

Very particular preference is given to compounds of the formula IX in which X is —O— or —NH—, $R_1$ is —H, $R_2$ is —$CH_3$, $R_3$ is $C_{12}$–$C_{18}$alkyl, and $X_2$ and $X_3$ together with the carbon atom to which they are bound form a ring of the formulae

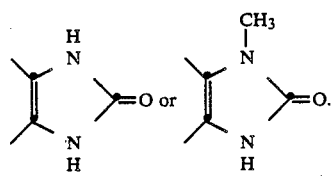

The compounds of the formula I can be prepared by processes known per se, for example:

(a) by condensation of 1 mol of a carboxylic acid halide, in particular a chloride, of the formula

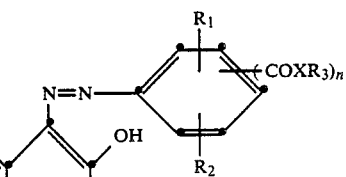

with an amine of the formula

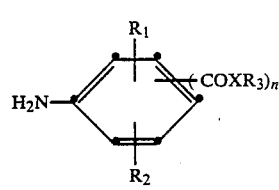

in accordance with, for example, U.S. Pat. No. 4,689,403, or by condensation of a carboxylic acid halide, in particular chloride, of the formula with 1 mol of a long-chain alcohol $R_3$-OH or an amine $R_3NH_2$, for example in accordance with U.S. Pat. No. 4,065,448, or (b) by diazotization of an amine of the formula followed by coupling of the diazo component obtained with a coupling component of the formulae -continued

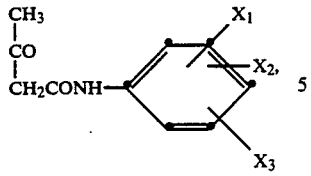

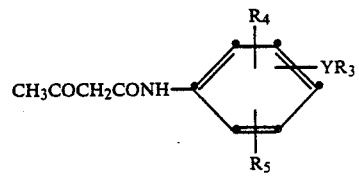

for example in accordance with U.S. Pat. No. 4,003,886, in which the groups n, $R_1$ to $R_3$, Hal, $X_1$, $X_2$, $X_3$ and Z are as defined above.

The condensation process according to the above scheme (a) is advantageously carried out in the presence of an organic inert solvent under normal or elevated pressure, with or without catalyst. Examples of suitable solvents are toluene, chlorobenzene, dichlorobenzenes, such as o-dichlorobenzene, furthermore trichlorobenzenes, nitrobenzene or mixtures of aromatic and/or aliphatic solvents, such as ®Shellsols.

The compounds of the formulae I in which X is —O— or —NH— can also be prepared via a transesterification or amidation reaction, by transesterifying or amidating a compound of the formula $H_2N$—D and coupling the resulting diazo component with a coupling component of the formula in which D, $R_4$, $R_5$, Y and $R_3$ are as defined above.

Most of the above coupling components are known intermediates. Only the coupling components of the last-mentioned formula are still novel. The carboxylic acid halides based on β-oxynaphthoic acid and the corresponding acids thereof are also novel intermediates. They can be obtained by known processes, for example in accordance with U.S. Pat. No. 4,689,403.

The invention accordingly also relates to compounds of the formulae XI and XII below:

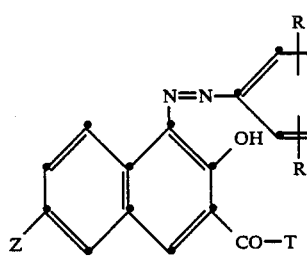

(XI)

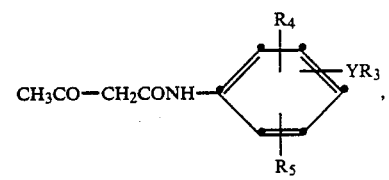

(XII)

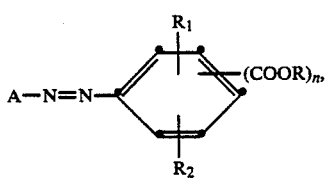

in which R is advantageously $C_1$-$C_3$alkyl, and the remaining radicals n, A, $R_1$ and $R_2$ are as defined above, by means of an alcohol of the formula $R_3$—OH or an amine of the formula $R_3$—$NH_2$ by known processes to give compounds of the formula I. R is methyl, ethyl, propyl or isopropyl.

The transesterification or amidation is advantageously carried out directly in an excess of the corresponding long-chain alcohol or amine, if appropriate in the presence of an organic solvent, for example toluene, xylenes, dichlorobenzenes, nitrobenzene, chloronaphthalene, anisole, ®Dowtherm, or ketones, such as cyclohexanone, at elevated temperature, for example in the boiling range of the solvent used, under normal or elevated pressure, with or without catalysts. If catalysts are used, sulfuric acid, p-toluene sulfonic acid, methanesulfonic acid, LiH, $LiNH_2$, $NaOCH_3$, potassium tert-butoxide, tetraalkyl titanates, dibutyltin oxide or rare earths are suitable.

The compounds of the formula II can be prepared, for example, by diazotizing an amine of the formula in which n is the number 1 or 2, $R_1$ and $R_4$ are —H or —Cl, $R_2$ and $R_5$ are —H, halogen, —$NO_2$, —CN, $C_1$-$C_4$alkyl, $C_1$-$C_4$alkoxy, —$CF_3$ or phenyloxy which is unsubstituted or substituted by one or two chlorine atoms and/or one or two methyl or methoxy groups, $R_3$ is alkyl having at least 10 C atoms, Z is —H, —Br, —$OCH_3$, —CN or $NO_2$, and T is —OH or halogen, X is a radical of the formulae —NH—, —O—,

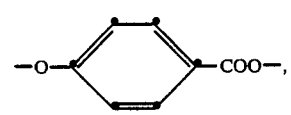

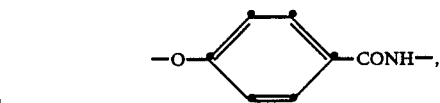

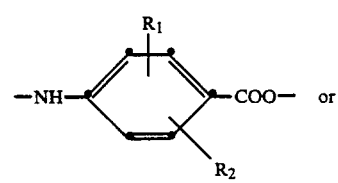

or

-continued

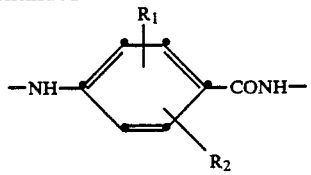

in which R₁ and R₂ are as defined above and Y is a radical of the formula —COO—, —OOC—, —CONH—, —NHCO—,

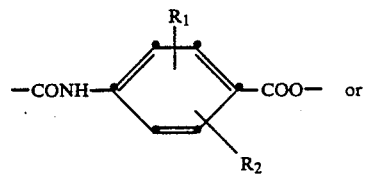

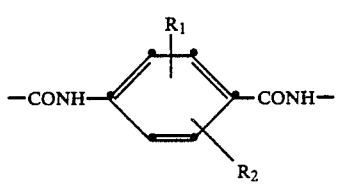

in which R₁ and R₂ are as defined above.

Halogen, $C_1$–$C_4$alkyl, $C_1$–$C_4$alkoxy and R₃ are as defined above. T is preferably —OH or —Cl. Y is preferably —CONH— or —COO—.

Preferred compounds according to formula XI have the formula XIII

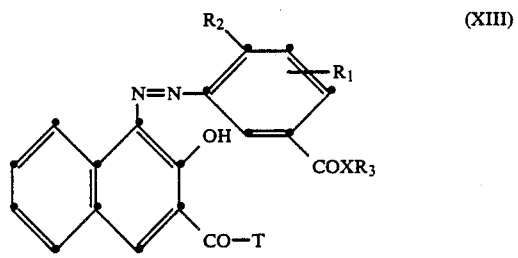

(XIII)

in which R₁, R₂, R₃, X and T are as defined above.

Highly preferred compounds have the formula XIII in which R₁ is —H, R₂ is —Cl, —CH₃ or —OCH₃, R₃ is $C_{12}$–$C_{18}$alkyl, X is —O— or —NH— and T is —OH or —Cl.

After their synthesis, the compounds of the formulae I and II are isolated as usual, for example by filtration. The filtered material is washed, for example, with one of the solvents already mentioned above and then advantageously again with water. They are usually obtained in high yield and purity and can be used without further purification in finely divided form for the mass colouration of plastics, in particular of polyolefins.

If their purity and/or particle form and size is not yet satisfactory or optimum for their use as pigments, the compounds according to the application can be further conditioned. Conditioning is understood to mean the preparation of a fine particle form and size which is optimum for the application, for example by dry milling in the presence or absence of salt, by milling in the presence of solvents or water or by salt kneading or by a subsequent thermal solvent treatment.

Thermal solvent treatments can be carried out, for example, in organic solvents, preferably in those which boil above 100° C.

It has been found that particularly suitable solvents are benzenes substituted by halogen atoms, alkyl or nitro groups, such as toluene, chlorobenzene, o-dichlorobenzene, xylenes or nitrobenzene, alcohols, such as isopropanol or isobutanol, furthermore ketones, such as cyclohexanone, ethers, such as ethylene glycol monomethyl or monoethyl ether, amides, such as dimethylformamide or N-methylpyrrolidone and also dimethyl sulfoxide, sulfolane or water alone, if appropriate under pressure. The aftertreatment can also be carried out in water in the presence of organic solvents and/or with the addition of surface-active substances or aliphatic amines, or in liquid ammonia.

Depending on the conditioning process and/or intended application, it can be advantageous to add certain amounts of texture-improving agents before or after their conditioning process to the compound according to the invention of the formulae I or II. Suitable compounds of this type are in particular fatty acids having at least 18 C atoms, for example stearic or behenic acid or amides or metal salts thereof, in particular Mg salts. The texture-improving agents are preferably used in amounts of 0.1–30% by weight, in particular 2–15% by weight, relative to the final product.

However, due to their excellent compatibility with polyolefins, the resulting compounds according to the invention of the formulae I and II can often be incorporated direct into polyolefins, for the purpose of coloration, without any further conditioning such as mechanical comminution or preparation.

Although they are in particular suitable for the mass colouration of polyolefins, they can also advantageously be used for the mass coloration of other polymers, for example polyvinyl chloride, but in particular for the colouration of engineering plastics, for example polycarbonates, polyacrylates, polymethacrylates, ABS, polyesters, polyamides, polyether ketones, polyurethanes, individually or in mixtures. Advantageously, they are used in a concentration of 0.01 to 5% by weight, relative to the polymer.

Examples of polyolefins which can be coloured by means of the compounds according to the invention of the formulae I and II are polyethylene of high and low density (HDPE, LDPE and LLDPE), polypropylene and polyisobutylene, and copolymers of polyolefins with, for example, polyethers, polyether ketones or polyurethanes.

The coloration is carried out by conventional processes, for example by mixing a compound of the formulae I or II with the plastic granules or powder and extruding the mixture to give fibres, sheets or granules. The latter can then be moulded to articles by injection-moulding.

The colorations obtained have high purity and high saturation and are distinguished by good resistance, in particular to heat and light, and by their low bleeding tendency. A particular advantage of polyethylene articles coloured by means of the compounds according to the invention of the formulae I and II is that they do not show, in particular in the case of HDPE, any increased tendency for distortion and deformation phenomena.

The fibres colored by means of the compounds according to the invention of the formulae I and II have excellent textile properties, for example light and wet fastness properties towards detergents and solvents.

The Examples which follow serve to illustrate the invention.

EXAMPLE 1

4.05 g of stearyl 4-methyl-3-aminobenzoate and 3.8 g of 4-benzoylamino-1-(2'-hydroxy-3'-naphthoylamino)-benzene are dissolved in a mixture of 125 ml of glacial acetic acid and 125 ml of N-methylpyrrolidone at 70° C. The clear red-brown solution is cooled to 40° C., and 2.55 ml of a 4N sodium nitrite solution are added dropwise at this temperature. A red precipitate is formed. The resulting red suspension is stirred for another 6 hours. The product is then filtered off with suction and washed with 300 ml of ethyl alcohol. After drying in vacuo at 60° C., 7.2 g (90.5% of theory) of a deep red powder of the formula

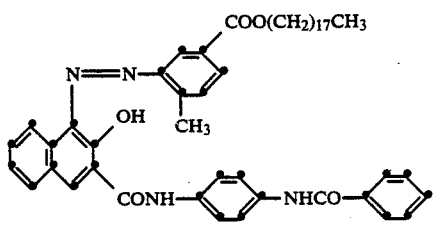

is obtained, which gives the following combustion analysis ($C_{50}H_{60}N_4O_5$): Calc. (in %): C 75.35 H 7.59 N 7.03; Found (in %): C 75.30 H 7.64 N 6.81.

This product which is aftertreated at 125° C. for 1 hour in ethylene glycol monoethyl ether colours polyethylene in strong pure red hues of excellent heat and light resistance.

EXAMPLE 2 TO 51

In the Table below, further compounds are described, which are obtained analogously to the above Example 1 by coupling of the diazotized amine according to column I with a coupling component from column II. Column III shows the hue of the PVC sheet colored by means of the compounds thus obtained. In the cases where the components of columns I and II already give a clear solution in glacial acetic acid of up to 80° C., the addition of N-methylpyrrolidone can be omitted. Otherwise, the procedure of Example 1 is followed.

| Ex. | I | II | III |
|---|---|---|---|
| 2 | N-stearyl-4-methyl-3-amino-benzamide | 4-Benzoylamino-1-(2'-hydroxy-3'-naphthoylamino)-benzene | scarlet |
| 3 | Stearyl-3-amino-benzoate | 4-Benzoylamino-1-(2'-hydroxy-3'-naphthoylamino)-benzene | orange |
| 4 | Stearyl-4-chlor-3-amino-benzoate | 4-Benzoylamino-1-(2'-hydroxy-3'-naphthoylamino)-benzene | orange-red |
| 5 | n-Decyl-4-methyl-3-amino-benzoate | 4-Benzoylamino-1-(2'-hydroxy-3'-naphthoylamino)-benzene | cermine |
| 6 | Lauryl-4-methyl-3-amino-benzoate | 4-Benzoylamino-1-(2'-hydroxy-3'-naphthoylamino)-benzene | red |
| 7 | n-Tetradecyl-4-methyl-3-amino-benzoate | 4-Benzoylamino-1-(2'-hydroxy-3'-naphthoylamino)-benzene | red |
| 8 | Stearyl-4-methyl-3-amino-benzoate | 4-(4''-Chlorbenzoylamino)-1-(2'-hydroxy-3-naphthoylamino)-benzene | red |
| 9 | Stearyl-4-methyl-3-amino-benzoate | 4-Benzoylamino-2,5-diethoxy-1-(2'-hydroxy-3'-naphthoylamino)-benzene | red-brown |
| 10 | Stearyl-4-methyl-3-amino-benzoate | 4-(4''-Acetamino-benzoylamino)-1-(2'-hydroxy-3'-naphthoylamino)-benzene | red |
| 11 | Stearyl-4-methyl-3-(4'-methyl-3'-amino-benzoylamino)-benzoate | N-phenyl-2-hydroxy-3-naphthamide | red |
| 12 | N-stearyl-4-methyl-3-(4'-methyl-3'-amino-benzoylamino)-benzamide | N-phenyl-2-hydroxy-3-naphthamide | red |
| 13 | Stearyl-4-methyl-3-(4'-chlor-3'-amino-benzoylamino)-benzoate | N-phenyl-2-hydroxy-3-naphthamide | scarlet |
| 14 | Stearyl-4-chlor-3-(4'-chlor-3'-amino-benzoylamino)-benzoate | N-phenyl-2-hydroxy-3-naphthamide | orange-red |
| 15 | Stearyl-4-methyl-3-(4'-methyl-3'-amino-benzoylamino)-benzoate | 4-Benzoylamino-1-(2'-hydroxy-3'-naphthoylamino)-benzene | cermine |
| 16 | N-stearyl-4-methyl-3-(4'-methyl-3'-amino-benzoylamino)-benzamide | 4-Benzoylamino-1-(2'-hydroxy-3'-naphthoylamino)-benzene | cermine |
| 17 | Stearyl-4-methyl-3-(4'-chlor-3'-amino-benzoylamino)-benzoate | 4-Benzoylamino-1-(2'-hydroxy-3'-naphthoylamino)-benzene | red |
| 18 | Stearyl-4-chlor-3-(4'-chlor-3'-amino-benzoylamino)-benzoate | 4-Benzoylamino-1-(2'-hydroxy-3'-naphthoylamino)-benzene | scarlet |
| 19 | N-stearyl-4-methyl-3-amino-benzamide | 4-(2'-Hydroxy-3'-naphthoylamino)-benzanilide | red |
| 20 | Stearyl-4-chlor-3-amino-benzoate | 4-(2'-Hydroxy-3'-naphthoylamino)-benzanilide | orange-red |
| 21 | Stearyl-4-methoxy-3-amino-benzoate | 4-(2'-Hydroxy-3'-naphthoylamino)-benzanilide | cermine |
| 22 | Stearyl-4-methyl-3-(4'-methyl-3'-amino-benzoylamino)-benzoate | 4-(2'-Hydroxy-3'-naphthoylamino)-benzanilide | red |
| 23 | N-stearyl-4-methyl-3-(4'-methyl-3'-amino-benzoylamino)-benzamide | 4-(2'-Hydroxy-3'-naphthoylamino)-benzanilide | red |
| 24 | Stearyl-4-methyl-3-(4'chlor-3'-amino-benzoylamino)-benzoate | 4-(2'-Hydroxy-3'-naphthoylamino)-benzanilide | red |
| 25 | Stearyl-4-chlor-3-(4'-chlor-3'-amino-benzoylamino)-benzoate | 4-(2'-Hydroxy-3'-naphthoylamino)-benzanilide | scarlet |
| 26 | Stearyl-4-methyl-3-amino-benzoate | 5-(2'-Hydroxy-3'-naphthoylamino)-6-methyl- | red-brown |

| Ex. | I | II | III |
|---|---|---|---|
| 27 | N-stearyl-4-methyl-3-amino-benzamide | 5-(2'-Hydroxy-3'-naphthoylamino)-6-methyl-benzimidazolone | red-brown |
| 28 | Stearyl-4-methyl-3-amino-benzoate | 5-(2'-Hydroxy-3'-naphthoylamino)-6-chlor-benzimidazolone | red-brown |
| 29 | Stearyl-4-methyl-3-amino-benzoate | 6-(2'-Hydroxy-3'-naphthoylamino)-4-methyl-7-chlor-2-quinolone | red-brown |
| 30 | Stearyl-4-methyl-3-amino-benzoate | 7-(2'-Hydroxy-3'-naphthoylamino)-phen-3-morpholone | red-brown |
| 31 | Stearyl-4-methyl-3-amino-benzoate | 6-(2'-Hydroxy-3'-naphthoylamino)-2-methyl-4-quinazolone | red-brown |
| 32 | Stearyl-4-methyl-3-amino-benzoate | 5-(2'-Hydroxy-3'-naphthoylamino)-7-chloro-benzimidazolone | red-brown |
| 33 | Stearyl-4-methyl-3-(4'-methyl-3'-amino-benzoylamino)-benzoate | 5-(2'-Hydroxy-3'-naphthoylamino)-1-methyl-benzimidazolone | red |
| 34 | Stearyl-4-methyl-3-(4'-chloro-3'-amino-benzoylamino)-benzoate | 5-(2'-Hydroxy-3'-naphthoylamino)-1-methyl-benzimidazolone | red |
| 35 | Stearyl-4-chloro-3-(4'-chloro-3'-amino-benzoylamino)-benzoate | 5-(2'-Hydroxy-3'-naphthoylamino)-1-methyl-benzimidazolone | red |
| 36 | N-stearyl-4-methyl-3-amino-benzamide | 6-Acetoacetylamino-benzimidazolone | yellow |
| 37 | Stearyl-4-methyl-3-amino-benzoate | 1-Methyl-5-acetoacetylamino-benzimidazolone | yellow |
| 38 | n-Decyl-4-amino-benzoate | 6-Acetoacetylamino-benzimidazolone | yellow |
| 39 | Lauryl-4-methyl-3-amino-benzoate | 6-Acetoacetylamino-benzimidazolone | yellow |
| 40 | n-Tetradecyl-4-methyl-3-amino-benzoate | 6-Acetoacetylamino-benzimidazolone | yellow |
| 41 | Stearyl-4-methyl-3-(4'-methyl-3'-amino-benzoylamino)-benzoate | 6-Acetoacetylamino-benzimidazolone | yellow |
| 42 | Stearyl-4-methyl-3-(4'-chloro-3'-amino-benzoylamino)-benzoate | 6-Acetoacetylamino-benzimidazolone | yellow |
| 43 | Stearyl-4-chloro-3-(4'-chloro-3'-amino-benzoylamino)-benzoate | 6-Acetoacetylamino-benzimidazolone | green-yellow |
| 44 | 5-Amino-6-chloro-benzimidazolone | Stearyl-3-acetoacetylamino-4-methyl-benzoate | green-yellow |
| 45 | Stearyl-anthranilate | 4-Acetoacetamino-acetanilide | yellow |
| 46 | Stearyl-anthranilate | 6-Acetoacetylamino-benzimidazolone | yellow |
| 47 | Stearyl-anthranilate | 5-Acetoacetylamino-6-chlorbenzimidazolone | yellow |
| 48 | Stearyl-anthranilate | 1-Methyl-5-acetoacetylamino-benzimidazolone | yellow |
| 49 | N-stearylanthranilamide | 6-Acetoacetylamino-benzimidazolone | yellow |
| 50 | N-stearylanthranilamide | 1-Methyl-5-acetoacetylamino-benzimidazolone | yellow |
| 51 | N-stearyl-4-methyl-3-amino-benzamide | 1-(2'-Hydroxy-3'-naphthoylamino)-naphthalene | cermine |
| 52 | Stearyl-anthranilate | 4-Benzoylamino-1-(2'-hydroxy-3'-naphthoyl-amino)-benzene | scarlet |
| 53 | Stearyl-anthranilate | 4-(2'-Hydroxy-3'-naphthoylamino)-benzo-4''-toluidide | red |
| 54 | Stearyl-anthranilate | 4-Benzoylamino-1-(2'-hydroxy-3'-naphthoyl-amino)-benzene | scarlet |
| 55 | N-stearyl-anthranilamide | 4-Benzoylamino-1-(2'-hydroxy-3'-naphthoyl-amino)-benzene | red |
| 56 | Lauryl-anthranilate | 5-(2'-Hydroxy-3'-naphthoylamino)-benz-imidazolone | red-brown |
| 57 | Lauryl-anthranilate | 5-(2'-Hydroxy-3'-naphthoylamino)-6-methyl-benzimidazolone | brown |
| 58 | Stearyl-anthranilate | 5-(2'-Hydroxy-3'-naphthoylamino)-benz-imidazolone | red-brown |
| 59 | Stearyl-anthranilate | 5-(2'-Hydroxy-3'-naphthoylamino)-benz-imidazolone | red-brown |
| 60 | Stearyl-anthranilate | 5-(2'-Hydroxy-3'-naphthoylamino)-1-methyl-benzimidazolone | red |

EXAMPLE 61

12.4 g of the azo dye from diazotized stearyl 4-methoxy-3-aminobenzoate and 2-hydroxy-3-naphthoic acid are suspended in 120 ml of anhydrous toluene. 2 ml of thionyl chloride and 4 drops of dimethylformamide are added to the mixture, which is then heated at 80° C. with stirring for one hour and 15 minutes. The bordeaux-colored solution is completely evaporated in vacuo. The product obtained is then removed from the flask by means of 50 ml of petroleum ether, filtered off with suction, and dried at 50° C. in vacuo. This gives 12.2 g (95.7% of theory) of the azo carbonyl chloride of the formula

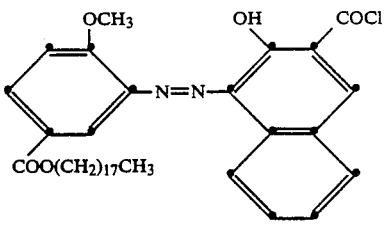

and melting point 129° to 130° C.

Combustion analysis: Calc.: C 69.74 H 7.75 Cl 5.56 N 4.40% Found: C 69.66 H 7.75 Cl 5.65 N 4.22%

6.4 g of the azo carbonyl chloride thus prepared are stirred with 100 ml of N-methylpyrrolidone, and the mixture is heated to 60° C. At this temperature, 1.6 g of 5-amino-1-methylbenzimidazolone are added to the clear black solution, resulting in a thick red suspension, which is heated to 92° C. with stirring and stirred at this temperature for 7 hours. The suspension is cooled to room temperature and diluted with 60 ml of ethanol. The product is finely filtered off with suction and washed with 200 ml of ethanol. Drying of the product at 60° C. in vacuo gives 7.2 g (94% of theory) of a red powder in the form of soft granules, which colors, for example, polyethylene, polyamide and polyvinyl chloride in strong red hues which have good heat and light resistance.

The formula of the product obtained:

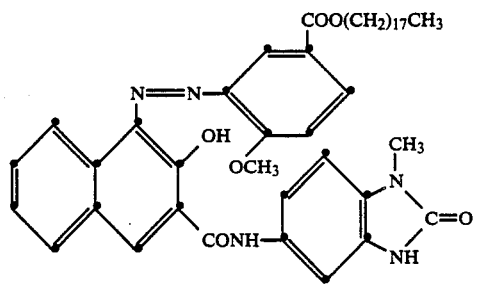

Combustion analysis: Calc.: C 70.75 H 7.52 N 9.17%
Found: C 70.78 H 7.64 N 9.11%

The Table below contains further pigments, which can be prepared by the process of the above Example 61 by coupling the diazo compound of one of the amines listed in column I on to 2-hydroxy-3-naphthoic acid, subsequently converting the azo carboxylic acid obtained into the corresponding acid chloride, which is condensed with one of the amines listed in column II. Column III lists the hue of the polyvinyl chloride sheet coloured by means of the pigments obtained.

| Ex. | I | II | III |
|---|---|---|---|
| 62 | Stearyl-4-methyl-3-amino-benzoate | 5-Amino-1-methyl-benzimidazolone | red |
| 63 | Stearyl-4-methyl-3-amino-benzoate | 5-Amino-benzimidazolone | red-brown |
| 64 | Stearyl-2-amino-terephthalate | 5-Amino-6-methyl-benzimidazolone | yellow-brown |
| 65 | Stearyl-3-amino-benzoate | 5-Amino-1-methyl-benzimidazolone | red |
| 66 | Stearyl-4-chloro-3-amino-benzoate | 5-Amino-1-methyl-benzimidazolone | orange-red |
| 67 | n-Decyl-4-methyl-3-amino-benzoate | 5-Amino-1-methyl-benzimidazolone | red |
| 68 | Lauryl-4-methyl-3-amino-benzoate | 5-Amino-1-methyl-benzimidazolone | red |
| 69 | n-Tetradecyl-4-methyl-3-amino-benzoate | 5-Amino-1-methyl-benzimidazolone | red |

EXAMPLE 70

A mixture of 1.0 g of the product obtained according to Example (1) 1.0 g of antioxidant (®IRGANOX 1010, CIBA-GEIGY AG) and 1000 g of polyethylene HD granules (®VESTOLEN A 60-16, HUELS) is premixed in a 3 l glass bottle on a roller stand for 15 minutes. The mixture is then extruded twice through a single-screw extruder and then granulated. The granules thus obtained are then injection-moulded on an injection-moulding machine (®Allround Arburg 200) at 220° C., 250° C. and 300° C. at a residence time of 5 minutes each to give sheets. The sheets thus obtained have uniformly strong red colorations and are as distortion-free as moulded material of uncolored polyethylene. If the moulded sheets thus colored are left in an oven at 100° C. for 24 hours, no bleeding of the pigment from the plastic can be observed.

EXAMPLE 71

The procedure as described in Example 70 is repeated, except that 10 g of titanium dioxide ®KRONOS RN 57-P (KRONOS Titan GmbH) are used in addition to the colored pigment. Red pressed sheets are obtained which have the same heat resistances. The pressed sheets moulded between 200° and 300° C. do not show color changes after cooling.

EXAMPLE 72

1000 g of polypropylene granules (®DAPLEN PT-55, Chemie LINZ) and 1.0 g of the product obtained according to Example (1) are mixed in a 3 l bottle on a roller stand for 15 minutes. The mixture is then extruded twice through a single-screw extruder and then granulated. The granules thus obtained are spun at 280°-285° C. by the melt-spinning process. The fibres thus coloured have very good light resistance and excellent textile fastness properties, such as rub fastness and wet fastness towards detergents and solvents. The heat resistance at 285° C. is excellent.

EXAMPLE 73

100 g of polymethyl methacrylate granules (®DEGALAN 7E from DEGUSSA AG) and 0.2 g of the product obtained according to Example (1) are premixed in a 500 ml glass bottle on a roller stand for 20 minutes. The mixture is then extruded on a single-screw extruder to give a tape. A transparent strongly red-coloured plastic tape is obtained which has excellent heat and light resistances.

EXAMPLE 74

The procedure as described in Example 73 is repeated, except that polycarbonate granules (®MAKROLON 2800 from BAYER) are used instead of polymethyl methacrylate, to give transparent deep red tapes which have excellent heat and light resistances.

What is claimed is:

1. A compound of the formulae I or II

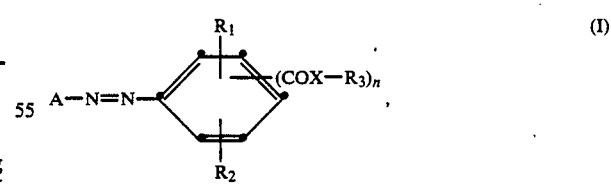

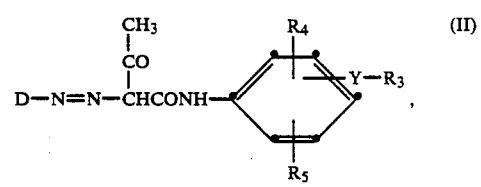

in which A is a radical of the formulae III, IV or V

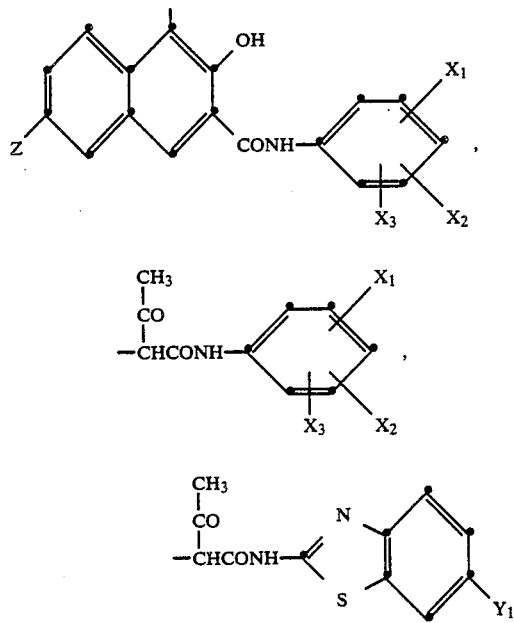

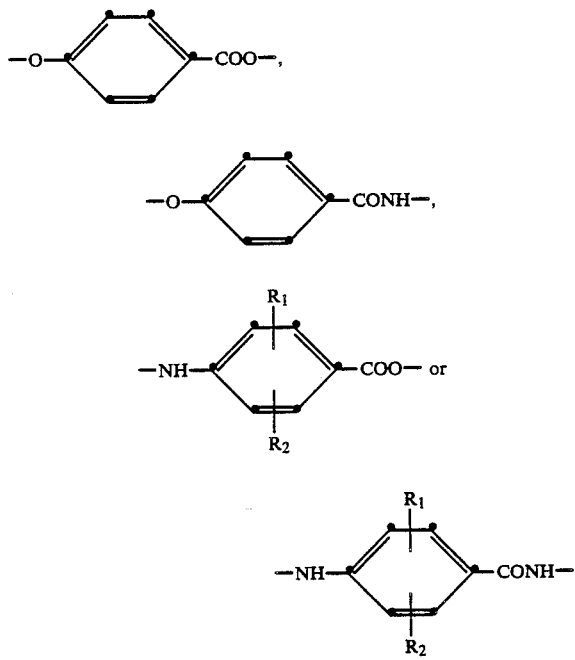

n is the number 1 or 2, Y is the radical of the formulae —COO—, —OOC—, —CONH— or —NHCO— or a radical of the formulae

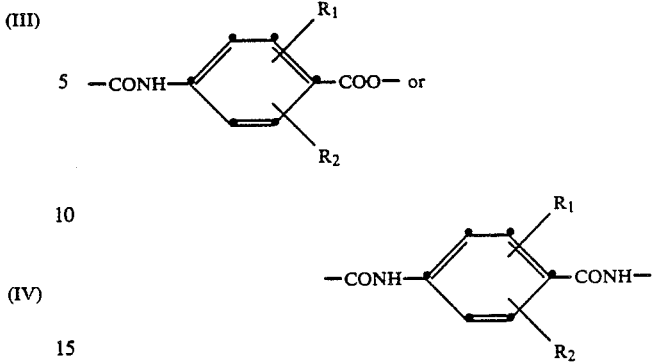

in which $R_1$ and $R_2$ are as defined above, D is a 5-benzimidazolonyl, 5- or 6-benzoxazolonyl, 6-(2,4-dihydroxy)-quinazolinyl, 6- or 7-(4-methyl)quinolone-2-yl, 6- or 7-phenmorpholone-3-yl or 6-quinazolone-4-yl radical, Z is —H, —Br, —OCH$_3$, —CN or —NO$_2$ and $X_1$, and $X_2$, independently of one another, are —H, halogen, —CH$_3$, —OCH$_3$—OC$_2$H$_5$ or —NO$_2$ and $X_3$ is —H, —NHCO—C$_1$-C$_4$-alkyl, benzoylamino or phenylcarboxamido which are each unsubstituted or substituted on the phenyl ring by one or two chlorine atoms, one or two methyl or methoxy groups, one or two chlorine atoms and one or two methyl or methoxy groups, or an —NHCO—C$_1$-C$_4$alkyl group, or $X_2$ and $X_3$ together with the carbon atom to which they are bound are an aromatic carboxylic 6-membered ring or an aromatic heterocyclic 5- or 6-membered ring selected from the group consisting of 5-amino-benzimidazolone, 7-chloro-5-amino-benzimidazolone, 7-bromo-5-amino-benzimidazolone, 6-chloro-5-amino-benzimidazolone, 6-bromo-5-amino-benzimidazolone, 6-methoxy-5-amino-benzimidazolone, 7-methoxy-5-amino-benzimidazolone, 6-ethoxy-5-amino-benzimidazolone, 7-chloro-4-methyl-5-amino-benzimidazolone, 6-methyl-5-amino-benzimidazolone, 4,7-dimethyl-5-amino-benzimidazolone, 4-methyl-6-chloro-5-amino-benzimidazolone, 5-amino-1-methyl-benzimidazolone, 6-amino-2,4-dihydroxyquinazoline, 6-amino-1,4-dihydroxyquinazoline, 6-amino-4-methyl-2-quinolone, 7-amino-4-methyl-2-quinolone, 7-amino-4,6-dimethyl-2-quinolone, 6-amino-7-chloro-4-methyl-2-quinolone, 7-amino-4-methyl-6-methoxy-2-quinolone, 5-aminobenzoxazolone, 6-aminobenzoxazolone, 6-amino-5-methyl-benzoxazolone, 6-amino-5-chloro-benzoxazolone, 6-amino-3-phenmorpholone, 7-amino-6-chloro-3-phenmorpholone, 7-amino-6-methyl-3-phenmorpholone, 7-amino-6-methoxy-3-phenmorpholone, 6-amino-4-methyl-3-phenmorpholone, 7-amino-4-methyl-3-phenmorpholone, 7-amino-4,6-dimethyl-3-phenmorpholone, 6-amino-4-quinazolinone and 5-aminophthalimide, and $Y_1$ is —H, OCH$_3$, —OC$_2$H$_5$ or —NHCOCH$_3$, with the proviso that $X_3$ must not be H, if X is —O— or —NH—.

2. A compound according to claim 1, in which X is —O— or —NH—, Y is a radical of the formula —COO— or —CONH— and n is the number 1.

3. A compound according to claim 1, in which $R_3$ is $C_{12}$-$C_{35}$alkyl, Y is —COO— or —CONH— and n is the number 1.

4. A compound according to claim 1, which has the formulae VI or VII

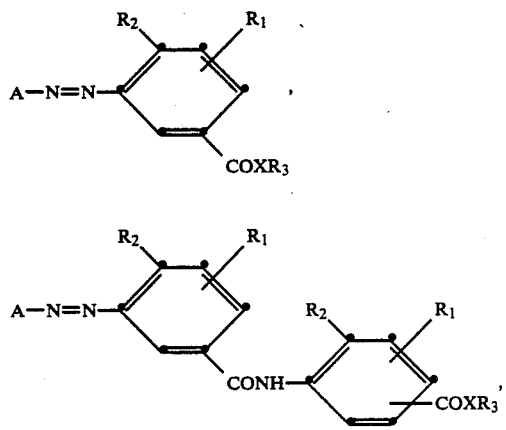

(VI)

(VII)

in which X is —O— or —NH—, $R_1$ is —H or —Cl, and $R_2$ is —Cl, —OCH$_3$, —CH$_3$, —OC$_2$H$_5$ or —OC$_6$H$_5$, A is a radical of the formula III according to claim 12 in which Z is —H, $X_1$ and $X_2$, independently of one another, are —H, —Cl, —CH$_3$ or —OCH$_3$, and $X_3$ is —H, —NHCOCH$_3$, benzoylamino or phenylcarboxamido which are each unsubstituted or substituted by one or two chlorine atoms, one or two methyl or methoxy groups, one or two chlorine atoms and one or two methyl or methoxy groups or by —NHCOCH$_3$, or $X_2$ and $X_3$ together with the carbon atom to which they are bound form a ring of the formulae

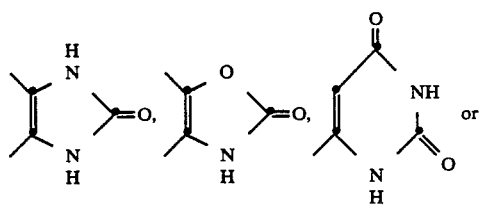

and $R_3$ is $C_{12}$-$C_{18}$alkyl, with the proviso that $X_3$ in formula VI must not be —H, if X is —O— or —NH—.

5. A compound according to claim 4, in which $R_1$ is —H, $R_2$ is —Cl, —CH$_3$ or —OCH$_3$, and the group —COXR$_3$ in formula VII is in the para-position relative to the group $R_2$.

6. A compound according to claim 4, which has the formula VIII

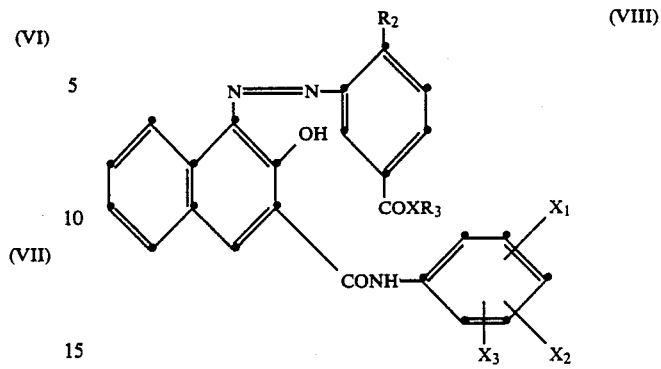

(VIII)

in which X is —O— or —NH—, $R_2$ is —CH$_3$ and $R_3$ is $C_{12}$-$C_{18}$alkyl.

7. A compound according to claim 1, which has the formula IX or X

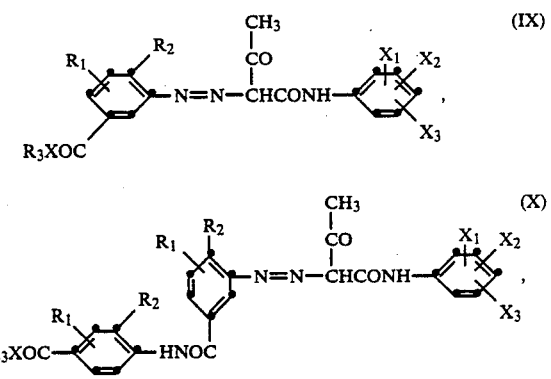

(IX)

(X)

in which X is —O—, or —NH—, $R_1$ is —H or —Cl, $R_2$ is —Cl, —CH$_3$ or —OCH$_3$ and $R_3$ is $C_{12}$-$C_{18}$alkyl, $X_1$ and $X_2$, independently of one another, are —H, —Cl, —CH$_3$ or —OCH$_3$, and $X_3$ is —H, —NHCOCH$_3$, benzoylamino which is unsubstituted or substituted by one or two chlorine atoms, one or two methyl or methoxy groups, one or two chlorine atoms and one or two methyl or methoxy groups or by —NHCOCH$_3$, or $X_2$ and $X_3$ together with the carbon atom to which they are bound form a ring of the formula

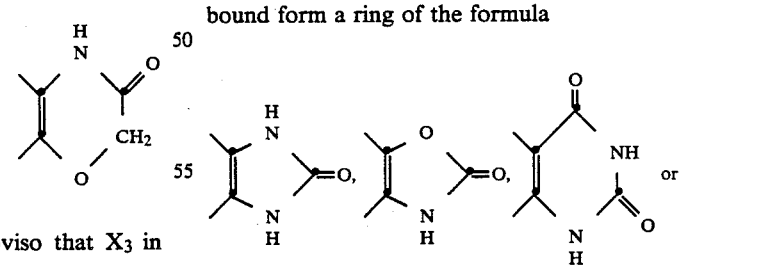

8. A compound of the formulae XI

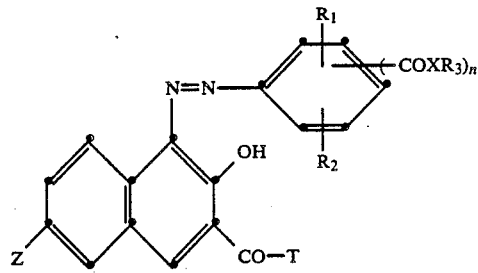 (XI)

in which n is the number 1 or 2, $R_1$ is —H or —Cl, $R_2$ is —H, halogen, —$NO_2$, —CN, $C_1$-$C_4$alkyl, $C_1$-$C_4$alkoxy, —$CF_3$ or phenyloxy which is unsubstituted or substituted by one or two chlorine atoms, one or two methyl or methoxy groups, or one or two chlorine atoms and one or two methyl or methoxy groups, $R_3$ is alkyl having at least 10 C atoms, Z is —H, —Br, —$OCH_3$, —CN or $NO_2$, T is —OH or halogen and X is a radical of the formulae —NH—, —O—,

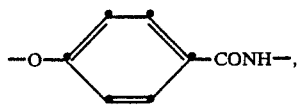

-continued

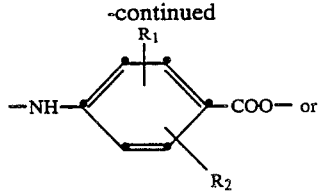

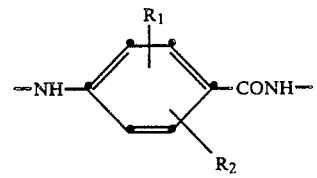

9. A compound according to claim 8, which has the formula XIII

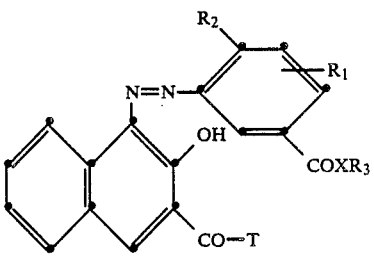 (XIII)

10. A compound of the formula XIII according to claim 9, in which $R_1$ is —H, $R_2$ is —Cl, —$CH_3$ or —$OCH_3$, $R_3$ is $C_{12}$-$C_{18}$alkyl, X is —O— or —NH— and T is —OH or —Cl.

* * * * *